United States Patent [19]

Stravitz

[11] 4,302,078
[45] Nov. 24, 1981

[54] PHOTOGRAPHIC FILTER HOLDER WITH THREADED ADAPTER

[75] Inventor: David M. Stravitz, New York, N.Y.
[73] Assignee: Ambico Inc., Lynbrook, N.Y.
[21] Appl. No.: 86,055
[22] Filed: Oct. 18, 1979
[51] Int. Cl.³ .............................................. G02B 7/00
[52] U.S. Cl. ................................................... 350/318
[58] Field of Search ................... 350/318, 316, 58, 57, 350/65; 354/122

[56] References Cited

U.S. PATENT DOCUMENTS

| 2,197,184 | 4/1940 | Kemp | 350/58 |
| 3,940,775 | 2/1976 | Bodnar | 354/122 |

FOREIGN PATENT DOCUMENTS

| 4246 | 9/1979 | European Pat. Off. | 350/318 |
| 936790 | 12/1955 | Fed. Rep. of Germany | 350/318 |
| 994298 | 11/1951 | France | 350/318 |
| 1203564 | 1/1960 | France | 350/58 |
| 473799 | 8/1952 | Italy | 350/58 |
| 258866 | 6/1949 | Switzerland | 350/58 |

OTHER PUBLICATIONS

Kodak Filter Info.
Hoya Filter Info.

*Primary Examiner*—Jon W. Henry
*Attorney, Agent, or Firm*—Frishauf, Holtz, Goodman and Woodward

[57] ABSTRACT

A filter holder having a plurality of slots therein for receiving filters, photographic effect sheets, or the like, and an adapter which is removably retained in one of said slots for threadably engaging a threaded front portion of a photographic lens. A lens cover element is provided which snapingly engages in the filter holder, and a rotatable filter is engaged in the filter holder and retained by the adapter, the filter being rotatable even in its engaged condition. A lens shade is provided which snapingly and removably engages the filter holder.

9 Claims, 17 Drawing Figures

U.S. Patent  Nov. 24, 1981  Sheet 1 of 3  4,302,078
FIG.1
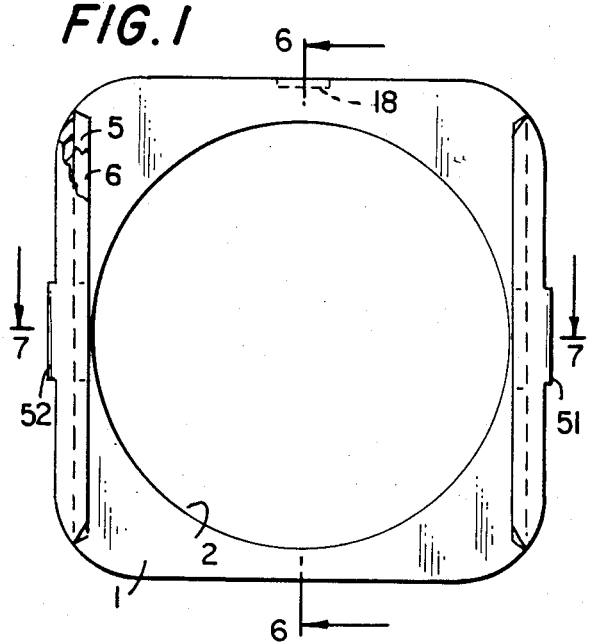
FIG.2
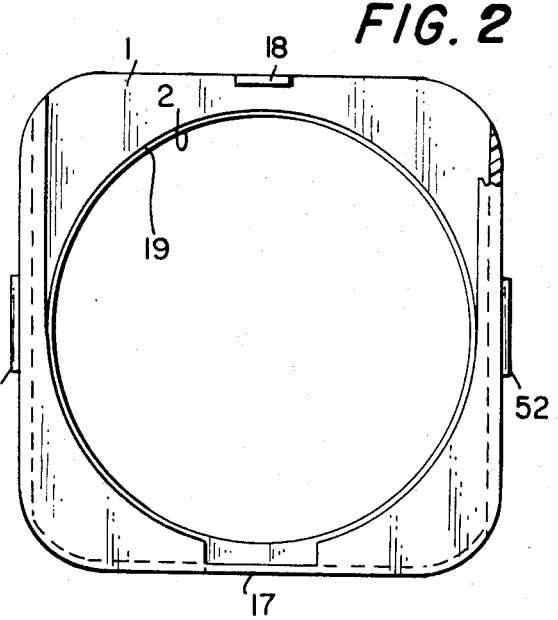
FIG.3
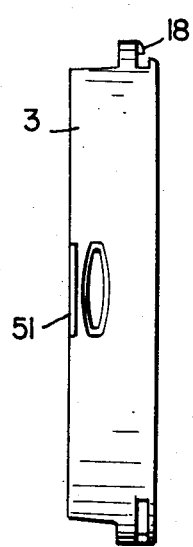
FIG.4
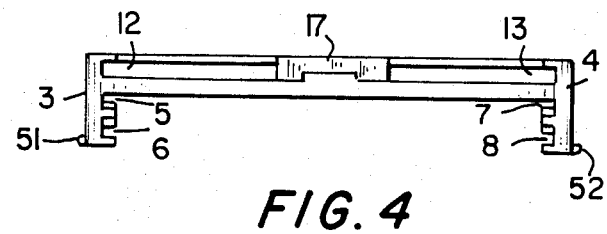
FIG.5
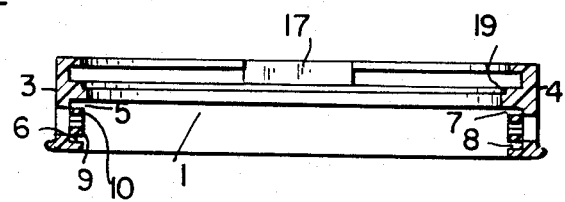
FIG.6
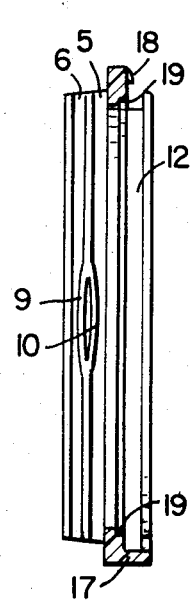
FIG.7

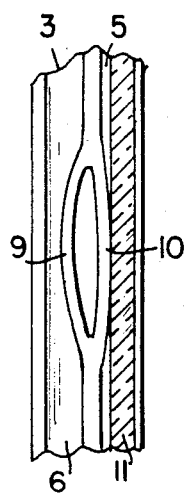
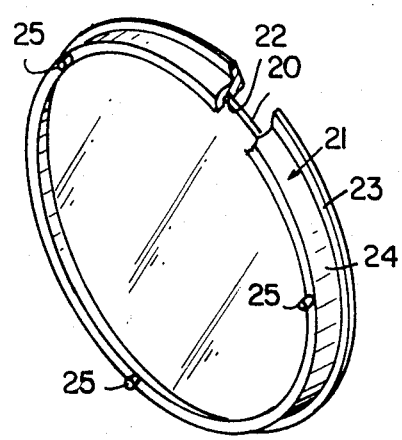
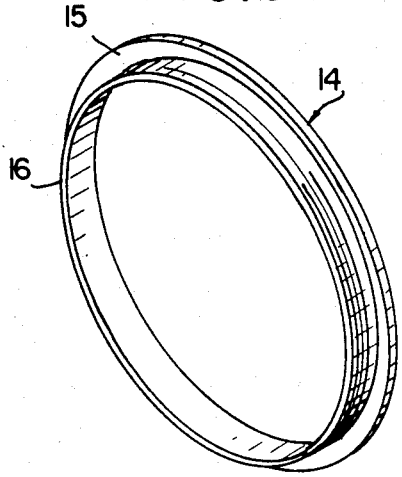
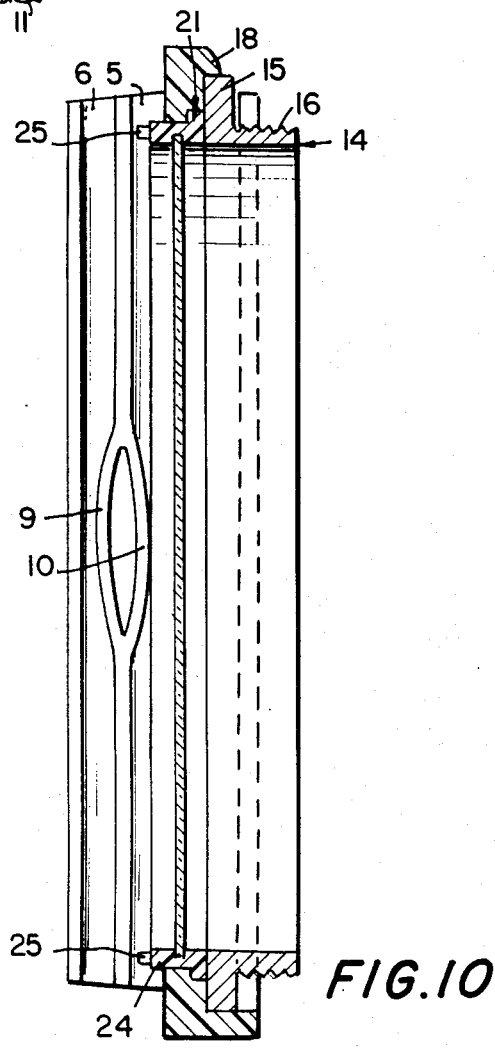
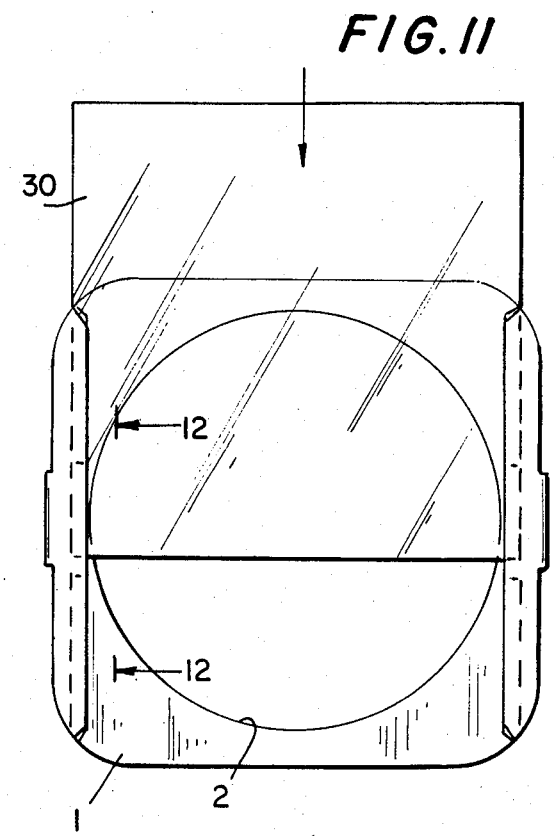

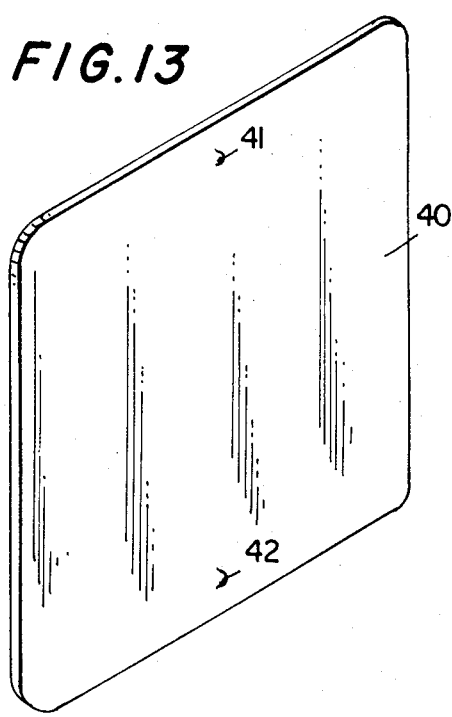
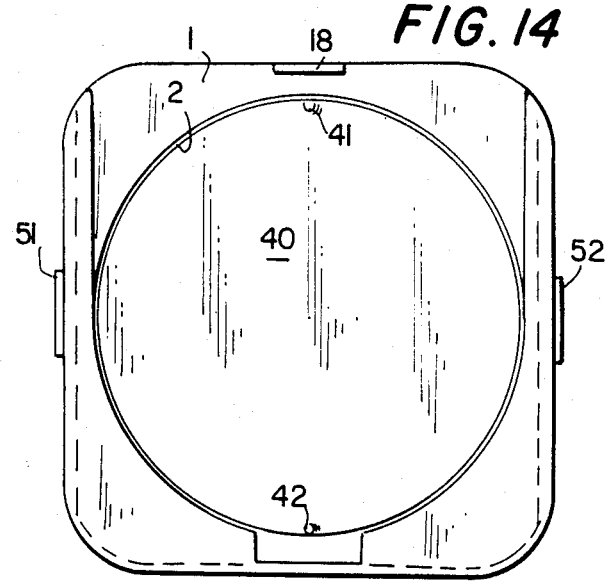
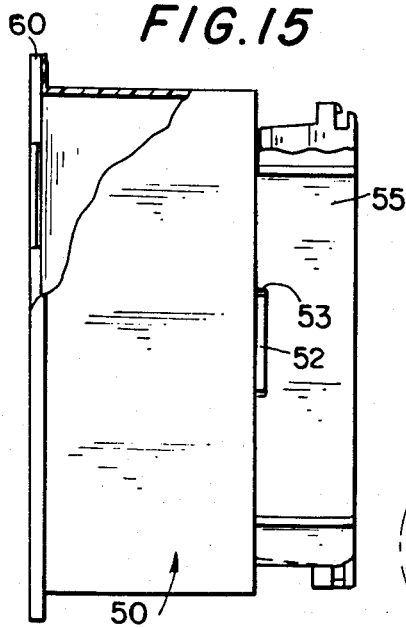
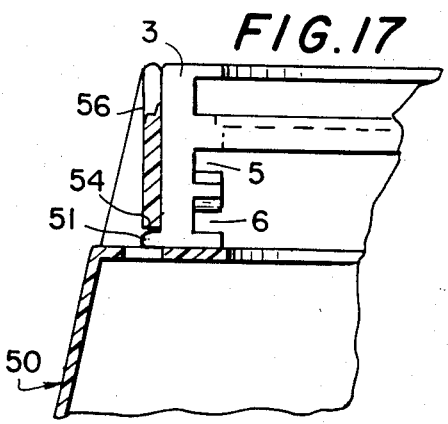
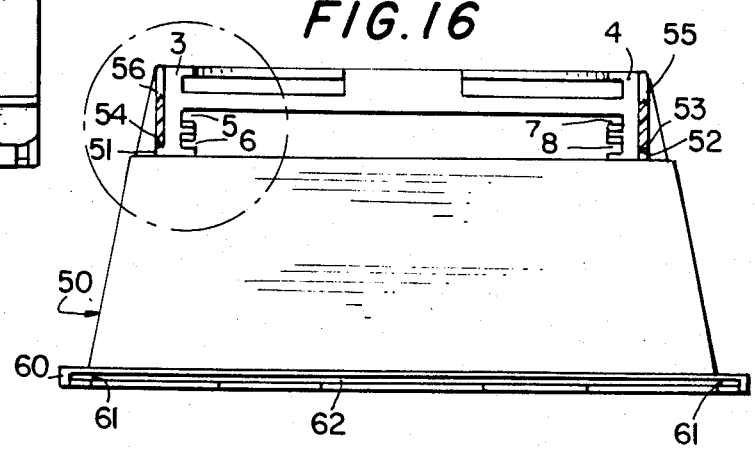

PHOTOGRAPHIC FILTER HOLDER WITH THREADED ADAPTER

BACKGROUND OF THE INVENTION

This application relates to photographic filter holders, and more particularly to filter holders with a removable adapter for threadably engaging the threaded front end of a camera lens.

Conventional filters are designed with threaded portions for threadably engaging a threaded front end of a photographic lens. However, different filters are required for different size camera lens, and all filters must have the threaded portion thereon for engaging the camera lens. Therefore, assembly of a complete system of filters is expensive. An attempt has been made at providing a filter holder with removable adapters so that the filter system can be adapted to different size camera lenses by only changing the adapter. Such a known filter system does not require each individual filter to include a threaded portion, thereby lowering the cost of the individual filters. All of the filters may be identically sized and shaped in such a system.

The object of the present invention is to provide an improved filter holder wherein all of the filters are identically sized and shaped so as to fit the filter holder, and wherein the filter holder comprises a removable adapter so that it can be adapted to different size camera lenses with minimum expense and difficulty.

Another object of the present invention is to provide such a filter holder with capabilities of receiving a removable lens shade.

A still further object of the invention is to provide such a filter holder in combination with a round filter, which round filter could be used as a polarizing filter, and in which such a polarizing filter, or other round filter, can be easily rotatably adjusted within the filter holder.

SUMMARY OF THE INVENTION

A filter holder according to the present invention comprises a main plate-like body portion having an opening therein; means coupled to the body portion and defining at least one channel on one side of the body portion and at least one channel on the opposite side of the body portion; and a threaded adapter having a flange for being removably received in the at least one channel on the opposite side of the body portion. The body portion comprises means for retaining the adapter in the at least one slot into which it is inserted, with the adapter being rotatable within the slot when retained therein. The body portion further has a recess coextensive with and adjacent the opening thereof for receiving a flange of a filter, or the like, inserted therein, the adapter having surface means overlying the recess for retaining the filter or the like in the recess. Resilient retaining means is coupled with the at least one channel on the one side of the body portion for retaining a filter or photographic effect sheet or plate inserted into the at least one channel.

Preferably, the filter or the like is formed of a resilient or flexible ring with a filter or the like removably retained in an internal groove or recess in the flexible ring. The filter is easily removed and replaced in the ring so that a set of filters or the like is inexpensively assembled.

A lens shade is also preferably provided and is removably engaged with the filter holder, the lens shade itself preferably having at least one slot or channel for receiving a filter or other photographic effect sheet.

BRIEF DESCRIPTION OF THE DRAWINGS

FIG. 1 is a front plan view of a filter holder according to the present invention;
FIG. 2 is a rear plan view thereof;
FIG. 3 is a side view thereof;
FIG. 4 is a top view thereof;
FIG. 5 is a bottom view thereof;
FIG. 6 is a cross-sectional view thereof taken along the line 6—6 in FIG. 1;
FIG. 7 is a cross-sectional view thereof taken along line 7—7 in FIG. 1;
FIG. 8 is a perspective view of a round filter in accordance with the present invention;
FIG. 9 is a perspective view of a threaded adapter for the filter holder of the present invention.
FIG. 10 is a sectional view, similar to that of FIG. 6, but with the round filter of FIG. 8 and with the adapter of FIG. 9 installed therein;
FIG. 11 is a front view of the filter holder of the present invention with a filter half-way into a filter receiving slot thereof;
FIG. 12 is an exploded view of a portion of the filter holder illustrating the filter retaining means therein;
FIG. 13 is a perspective view of a lens covering cooperating with the filter holder of the present invention;
FIG. 14 is a rear view of the filter holder with the lens cover of FIG. 13 installed therein;
FIG. 15 is a side view, partially in section, illustrating a lens shade according to the present invention attached to the filter holder of the present invention;
FIG. 16 is a top view of the lens shade and filter holder shown in FIG. 15; and
FIG. 17 is an exploded sectional view of the circled portion in FIG. 16.

DETAILED DESCRIPTION

Referring to FIGS. 1-7, the filter holder of the present invention is preferably the one-piece molded plastic structure having a main plate-like body portion 1 having a round opening 2 therein. Integral with the body portion and extending substantially perpendicularly to the body portion 1 are respective left and right side portions 3,4. Side member 3 has elongated slots for channels 5,6 formed therein, and side member 4 has elongated slots or channels 7,8 formed therein. Slots 5,7 cooperate to receive a filter, lens cover or other flat photographic element, and slots 6,8 cooperate to receive another such element. Side member 3 has flexible members 9,10 integrally formed therein, members 9 and 10 extending into channels 6 and 5, respectively, to form resilient constrictions in said channels. When a member is inserted into one of said channels 5,6, it presses against one of resilient members 9,10 depending upon which channel the member was inserted into, to cause the resilient member to yield, bearing against the inserted member, thereby retaining the inserted member in position. See, for example, FIG. 12 which illustrates a filter or the like 11 inserted into channel 5 to cause resilient member 10 to yield.

Rearward of body portion 1 are formed further slots 12,13 for receiving an adapter 14 (FIG. 9) which has a flange 15 and a threaded portion 16 extending from the flange 15. FIG. 10 illustrates the adapter 14 mounted in the filter holder of the invention. The flange 15 of the adapter 14 engages in the channels 12,13 and when it is in its fully inserted position, the flange 15 abuts against bottom member 17 of the filter holder. The upper portion of the filter holder comprises a projection 18 which snaps over the top of the flange 15 of adapter 14 when it is in its fully inserted portion to retain the adapter in said fully inserted postion. See, for example, FIG. 10. The adapter 14, in its fully inserted position, is retained sufficiently snugly so that the pieces are maintained firmly together, but sufficiently loose so that the filter holder can be rotated relative to the adapter 14 when mounted on a camera lens.

Body portion 1 has a recess 19 formed around the periphery of the opening 2 for receiving a round filter or other photographic element, such as that shown in FIG. 8.

Referring to FIG. 8, a round filter or other photographic element comprises a round, substantially flat filter element 20 received in a collar 21. The ring-shaped collar 21 has a recess 22 therein which is dimensioned to snugly receive filter elements 20. The collar or ring-shaped element 21 is integrally formed of plastic material or other flexible material so that the filter element 20 can be snapped in and out thereof. The collar or ring-shaped element 21 further has a flange 23 thereon which engages in recess 19 of body portion 1 of the filter holder. The portion 24 of the collar 21 which extends substantially perpendicularly to flange 23 extends through the opening 2 of body portion 1, as shown in FIG. 10. The filter 21 of FIG. 8 is retained in opening 2 so as to be rotatable in said opening 2. The filter is further provided with rear projections 25 which extend through the opening 2 of the filter holder, as seen in FIG. 10. So that a user may grip projections 25 to rotate the filter 21 within opening 2. This is particularly useful with polarizing filters or other filters wherein the angular position relative to the lens determines the photographic effect achieved.

As an alternative to the snap-in arrangement of FIG. 8, the collar 21 and filter element or other photographic effect element 20 may be molded as a single integral unit.

As seen from FIG. 10, the arrangement of the slots 12,13 and of the recess 19 in the opening 2 is such that when a filter 21 is inserted in the filter holder, it is retained in place by adapter 14. Thus, an additional space for a filter is provided without providing additional slots therefor. A unique advantage is also retained in that the filter 21 remains rotatable relative to the filter holder, thereby improving the functional effects obtained by the filter holder of the present invention.

As seen in FIG. 10, the portion 24 of filter 21 extends into channel 5, thereby rendering channel 5 unsuitable for receiving additional filters. However, channel 6 (and its associated channel 8) may receive a filter or other photographic device therein. If the filter 21 is made thin enough, it is possible to also permit channel 5 (and its associated channel 7) to be unobstructed and therefore suitable for receiving photographic elements, such as filters, special effects sheets, or the like.

FIG. 11 illustrates a front view of a filter holder of the present invention with a photographic filter or special effects sheet 30 partially inserted into channels 5,6 (and associated channels 7,8). By virtue of the resilient members 9,10 being provided substantially midway along the length of the channels 5,6, it is possible to insert and positively retain a filter sheet, or the like, 30 partially into the channels so as to cover only part of the lens. The other part of the lens may remain unobstructed, or another filter or photographic effects sheet can be inserted from the bottom (or top) into the same channels as sheet 30, or into the adjacent channels, so as to meet sheet 30 end-to-end or overlap sheet 30, as desired. If desired, additional resilient members 9,10 can be located along the length of the channels so as to provide even more possibilities for positively retaining filters or special effects sheets at various positions in the channels. Still further, additional channels 5-8 may be provided to produce greater combinational possibilities.

FIG. 13 illustrates a lens cover 40 for use with the present invention. Lens cover 40 has projections 41,42 thereon for retaining the lens cover 40 in the filter holder. FIG. 14 is a rear view of a filter holder with a lens cover 40 inserted therein. The lens cover 40 is insertable into either of channels 5,6 (and associated channels 7,8), and may be inserted into one of the channels even while a filter or other photographic effects device is inserted in the other channels. In FIG. 14, projections 41,42 project into opening 2 of body portion 1 to retain same in position. It should be clear that when lens cover 40 is inserted into channel 5, it is not possible to also have a round filter in opening 2, otherwise they would interfere with each other. However, the lens cover could be located in channel 6 (and associated channel 8) even when a round filter 21 is inserted in opening 2. However, in this case, projections 41,42 will be ineffective.

The lens protector cover can also be used to provide multiple exposures. The lens cover 40, which is made of material which does not pass light, can be inserted partially into the slots (as shown in FIG. 11) and a first exposure can be made. The lens cover 40 can then be located to cover the other part of the lens, and another exposure can be made, thereby providing multiple exposures. Further, as mentioned above, the cover 40 can be inserted into slot 6 (and associated slot 8) to protect not only the lens, but also filters which are inserted in the other slots. More than two exposures can be made using the above technique.

Referring to FIGS. 15-17, a lens shade 50 is snapable over the filter holder (as seen in FIGS. 16 and 17). Side members 3,4 of the filter device have side projections 51,52 which snapably engage openings 53,54 in sidewalls 55,56, respectively of lens shade 50. The sidewalls 55,56 of lens shade 50 are made of resilient material so that they yield to snapingly receive projections 51,52 in the openings thereof. Preferably, the lens shade 50 is integrally formed of plastic material having suitable yieldability.

The lens shade 50 does not have upper and lower walls, thereby leaving channels 5,6,7,8 unobstructed so that filters or other photographic effects devices can be inserted without removing the lens shade.

The forward end 60 of lens shade 50 has slots 61 for receiving additional photographic effects sheets or filters, as desired. The upper end of the slots 61 are unobstructed for insertion of the additional photographic effects devices therein. The lower front wall of shade 50 has a slot 62 therein for engaging the bottom edge of photographic effects sheets which are inserted therein.

The lens shades may be formed in different sizes to accommodate different types of film formats and lens focal lengths. The lens shade 50 is easily removed from the filter holder by pulling outwardly thereof and/or flexing the side walls 55,56 slightly outwardly to release same from engagement with projections 51,52 or the filter holder.

I claim:

1. A filter holder for photographic applications comprising:
    a main plate-like body portion (1) having an opening (2) therein;
    means (3,4) coupled to said body portion (1) and defining at least one channel (5-8) on one side of said body portion (1) and at least one channel (12,13) on the opposite side of said body portion (1);
    a threaded adapter (14) having a flange (15) for being removably received in said at least one channel on said opposite side of said body portion (1);
    said body portion (1) comprising means (17,18) for retaining said adapter in said at least one slot into which it is inserted, said adapter being rotatable within said slot when retained therein;
    a filter means (21) having a flange (23) and being shaped so as to conform to the shape of said opening (2) in said body portion (1);
    said body portion (1) having a recess (19) coextensive with and adjacent said opening (2) for receiving said flange (23) of said filter means when inserted therein, said adapter (14) having surface means overlying said recess (19) for retaining said filter means in said recess (19);
    resilient retaining means (9,10) coupled with said at least one channel (5-8) on said one side of said body portion (1) for retaining a filter or photographic effect sheet or plate inserted into said at least one channel (5-8).

2. The filter holder of claim 1 wherein said body portion comprises means (51,52) for engaging a lens shade.

3. The filter holder of claim 2 comprising a lens shade (50) which includes means (53,54,55,56) cooperable with said engaging means (51,52) of said body portion (1) for securing said lens shade (50) to said filter holder.

4. The filter holder of claim 3 wherein said lens shade further comprises channel means (61,62) at the forward end thereof for receiving at least one of filters and photographic effect sheets or plates.

5. The filter holder of claim 1 wherein said filter means having said flange thereon comprises a collar (21) fabricated of a substantially resilient material, said collar being generally ring-shaped and having a circular internal recess (22) therein for removably receiving a filter element (20) said filter element (20) being removable by resilient flexing of said collar (21) and pressing of said filter (20) out of said recess.

6. The filter holder of claim 1 or 5 wherein said filter means (21) is round and comprises means (25) thereon for engagement by a user for rotating said filter relative to said filter holder.

7. The filter holder of claim 6 wherein said means (25) for engagement by a user comprises projections on said filter means (21).

8. The filter holder of claim 1 or 5 wherein said filter means (21) and said opening (2) are both round.

9. The filter holder of claim 1 comprising two of said channels (5-8) on said one side of said body portion (1) and one channel (12,13) on said opposite side of said body portion (1).

* * * * *